Patented Oct. 31, 1933

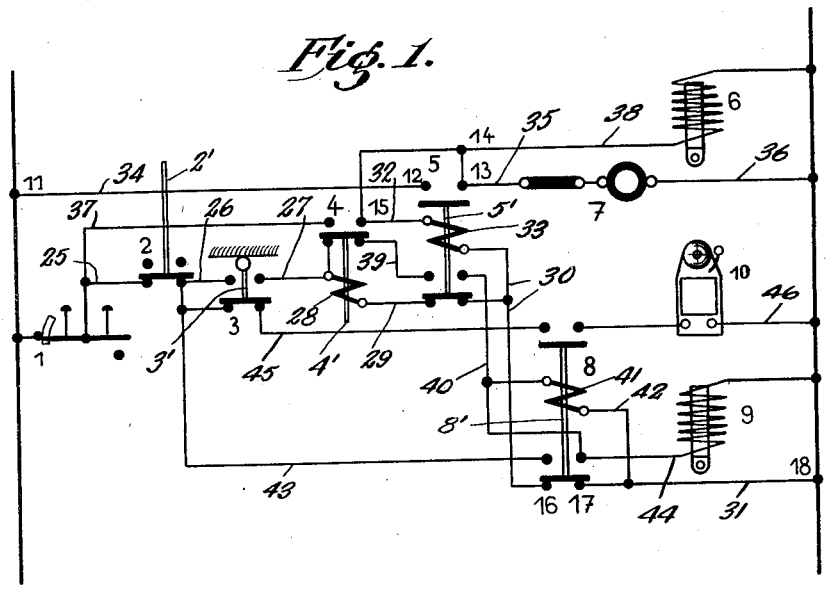

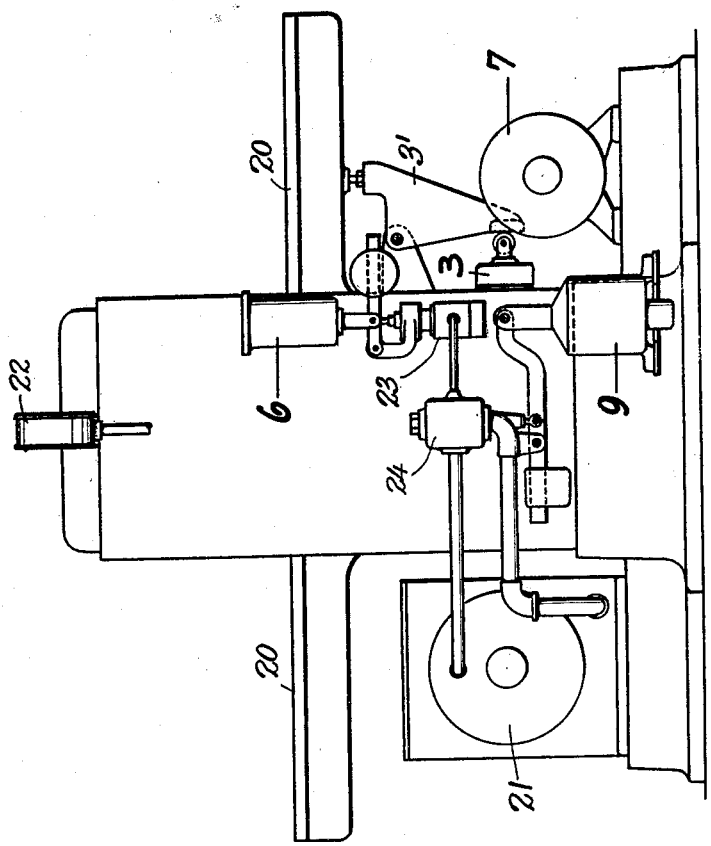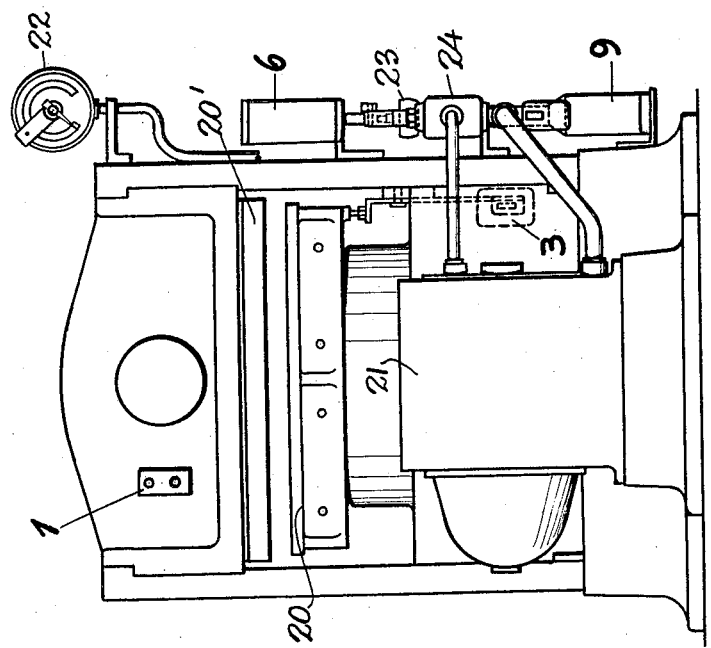

1,932,583

UNITED STATES PATENT OFFICE 1,932,583

AUTOMATIC CONTROL FOR HYDRAULIC MATRIX MOLDING DRYING PRESSES

Willibald Hamburger, Zell, near Wurzburg, Germany, assignor to Schnellpressenfabrik Koenig & Bauer Aktiengesellschaft, Wurzburg, Germany Application January 29, 1932, Serial No. 589,742, and in Germany February 17, 1931

8 Claims. (Cl. 18—17)

My invention relates to an automatic control for presses used for molding and drying matrices, the primary objects being to do away with the manual manipulations heretofore necessary and to substitute mechanical timing for the observation and manual operations of a machine minder.

Referring to the drawings, which are made a part of this application and in which similar reference characters indicate similar parts:

Fig. 1 is a wiring diagram of my control system,

Fig. 2, an end elevation of the machine so controlled, and

Fig. 3, a side elevation of the same.

Referring to the drawings, the known parts include a molding table 20, a press head 20', a pump motor 21 supplying fluid under pressure for elevating the molding table, a pressure gauge 22 for indicating the pressure on the matrix, which gauge is connected to the motor 21 to stop the same when sufficient pressure has been attained, a manually operated two-step valve 23 for controlling the drying pressure, a manually operated outlet valve 24 for relieving the pressure, a suction pump (not shown) for removing vapors generated in molding and drying a matrix, a motor 7 for said suction pump, heating means (not shown) for drying a matrix, and means in connection with such heating means for controlling the operation thereof.

It is known, that matrixes are not only molded in the so-called hydraulic matrix molding and drying presses, but also dried. Such a press has, besides an electric pressure pump, the pump motor which is switched on by push buttons and switched off by means of a pressure gauge with an easily adjustable maximum pressure, generally two heating devices with an automatic temperature regulation for the drying of the matrixes, as well as a suction device for sucking up the steam which collects on the matrixes in the drying process.

With the already known devices the working process is as follows:—

The matrix is placed with the form on the molding table 20 of the press. When the pump motor 21 has been switched on, the molding table rises slowly and molds the matrix by pressure against the press head 20', after which the pressure gauge 22, reaching the pre-adjusted pressure stops the motor 21. Then the minder must temporarily lift the outlet valve 24 by hand by means of a lever or handwheel, so that the pressure drops to the so-called drying pressure between 6 and 20 atmosphere (i. e. 85.32 and 284.40 pounds per square inch respectively) and at the same time sets the motor 7 of the suction device in motion. The drying of the matrix by the previously switched in heating means lasts, according to the degree of dampness, from 5 to 20 minutes, which time the minder must observe with the help of a clock. When the drying time has elapsed the minder must again disconnect the suction device by hand and open the outlet valve 24, so that the molding table returns to its lowest position and the matrixes can be taken out.

The switch mechanism which forms the object of the invention, possesses the great advantage that all executive switchings previously performed by the minder are now accomplished automatically by the press. For this purpose a control contact, connected with the molding table, is arranged in the switch circuit by means of the pump motor. This control contact in its highest position operates a time switch which, having been thrown into gear, switches on the heating connections in the circuit, a relay for the adjusting of the drying pressure and switches on the suction pump, during which it, having been thrown out of gear by the closing of a shunt circuit over a remote switch, opens the outlet valve of the pressure pipe by means of an electro-magnet, after which the control contact connected to the press table in its low position closes an electric signal current over the same remote switch. Thereby not only are the matrixes manufactured in shorter time and far more uniformly but the minder can also, during the working time of the press, perform other work attentively and without interruption. The hydraulic matrix molding and drying press, by means of the switch device according to the invention, operates absolutely automatically.

Fig. 1 sets forth a preferred form of the wiring diagram of a switch mechanism according to the invention.

The method of working of the switch device illustrated by the drawings is as follows:—

When the minder has put the form together with the matrix on the molding table of the press he sets the pump motor in motion by means of a switchboard 1 having buttons which may be marked "in" and "out". By pressing the "in" button a circuit may be closed through the switch 2 of the pump motor, the movable element 2' of this switch being raised by any suitable means on pressing said "in" button and remaining closed until released by the adjustable pressure gauge 22. The rising of member 2' breaks a circuit, hereinafter described, through a signal device 10.

As the table rises it carries with it a movable member 3' of switch 3 and closes a circuit through the upper pair of contacts of said switch. The predetermined molding pressure being attained the movable member 2' of switch 2 is caused to fall by the action of pressure gauge 22 and in its lower position element 2' closes a circuit through the coil 28 of a time switch 4, so that current now passes through conductor 25, switch 2, conductor 26, switch 3, conductor 27, coil 28, conductors 29 and 30, remote switch 8 and conductors 31 and 18. The adjustable time switch closes instantly and remains closed for whatever time may be desired for drying the molded matrix, e. g., 20 minutes, the time being predetermined by some such means as that used for adjusting the pressure gauge. When the time switch 4 is closed it closes a circuit through conductor 32, the coil 33 and conductors 30 and 31 to 18, thus elevating the movable member 5' of a remote switch 5 and closing a circuit from 11, through conductors 34, 35 and 36 to start the motor 7 of the drying pump to remove the vapor evolved by the molding and drying operations.

The closing of time switch 4 also closes a circuit through conductor 37, switch 4 and conductor 38 to electromagnet 6 which moves the two-step drying pressure valve to low pressure position.

The drying pressure two step valve is, in its first step, held by means of a spring the tension of which can be easily adjusted beforehand from about 4 to at the highest 20 atmospheres (56.88 to 284.40 lbs. per square inch) according to the desired drying pressure. The higher counter pressure in the second step is attained by means of an additional weight loading on the valve plate, which can be raised by means of the electro-magnet.

After the movable element of time switch 4 again returns to lower position remote switch 5 will still remain closed due to the circuit established through 11, 34, 12, 13, 14, 15, 33, 30, 16, 17 and 31 to 18. As soon as the time switch 4 has run down its movable element 4' falls and thereby closes a circuit through conductors 25, 26, 27, 39 and 40 to coil 41 of remote switch 8, and then by conductors 42 and 31 to line 18, raising the movable element 8' of switch 8. Such movement deenergizes coil 33 by breaking the circuit therefor at 16, 17, the movable element 5' of switch 5 falls and cuts out suction motor 7 and electromagnet 6. A shunt circuit is now closed across the middle pair of contacts of switch 8 through conductors 25, 43 and 44, energizing the electromagnet 9 for the outlet valve 24, so opening this valve and permitting the retained pressure to escape. The work table sinks whereby the lower contacts of switch 3 are closed by means of the contact plate which reaches its lowest position when the table also has attained its lowest position. In this position switch 3 closes now the circuit through conductors 25, 45 and 46 to the signal bell 10 which announces that the molding is ready. The minder takes out the finished matrixes after he has pressed the push button "out" of the push button board. Thereby the holding shunt circuit of the remote switch 8 is interrupted and the electromagnet 9 as well as the signal bell 10 switched off, so that the press is again ready immediately for another molding operation. When the "in" button is again pressed the circuit of signal 10 is again closed but is immediately broken by the rising of the table 20 and the switch member 3' attached thereto.

If the molding pressure on the pressure gauge, the drying pressure on the drying pressure valve and the drying time on the time switch are preadjusted, the minder need only, by the switch device according to the invention, bring the unmolded damp matrix together with the form to the molding table, push the button "in" for the pump, and then later, without further manipulation, at the sounding of the signal take out the finished molded and dried matrix.

I therefore particularly point out and distinctly claim as my invention:—

1. In a matrix molding and drying press having a press head, a movable press table, a pump motor for applying fluid pressure to the press table, a pressure gauge limiting the action of said motor, means for heating the molded matrix, a suction pump for withdrawing vapor from said matrix, a motor for operating said suction means, and adjustable controlling means for varying the pressure on the matrix while the same is being dried, the combination of a control contact movable with said press table to close a circuit, a two-position time switch moved to one position by the closing of said circuit said time switch setting the matrix heating means in operation, an electromagnet energized by such movement of said time switch, said electromagnet operating the pressure controlling means to lower the pressure to the amount desired for the drying operation, a circuit for the suction pump motor also closed by such actuation of said time switch, a remote switch, a shunt circuit closed by said time switch in its second position said shunt circuit including means for moving said remote switch, a circuit closed by such movement of said remote switch for opening the outlet valve, a signal, and a circuit for said signal said circuit including contacts closed by such movement of said remote switch and also including contacts closed by said control contact on return movement of the table for indicating completion of an operation.

2. A device as in claim 1, including a second remote switch, and a circuit for said last-named remote switch closed by said time switch when in one position, said circuit connecting the main line directly to the suction pump controlling means.

3. A device as in claim 1, including a holding circuit for said remote switch, a second remote switch in said circuit, a circuit for the outlet valve, and means for actuating said second remote switch to close the outlet valve circuit such movement of the second remote switch breaking said holding circuit.

4. A device as in claim 1, including a second remote switch, a circuit for said last-named remote switch closed by said time switch when in one position, said circuit connecting the main line directly to the suction pump controlling means, a holding circuit for said remote switch, a circuit for the outlet valve, and means for actuating said second remote switch to close the outlet valve circuit such movement of the second remote switch breaking said holding circuit.

5. A device as in claim 1, including a visual signal in the signal circuit.

6. A device as in claim 1, including an audible signal in the signal circuit.

7. A device as in claim 1, including spring means for loading said drying pressure valve combined with a loading weight adapted to be raised by said electromagnet.

8. In a matrix molding and drying press having a press head, a movable press table, a pump motor for applying fluid pressure to the press table, a pressure gauge limiting the action of said motor, means for heating the molded matrix, a suction pump for withdrawing vapor from said matrix, a motor for operating said suction means, and adjustable controlling means for varying the pressure on the matrix while the same is being dried, the combination therewith of time-controlled electrical means set in operation by said table for operating the heating means, said electrical means simultaneously reducing the pressure on the table to drying pressure and setting the suction means in operation, said means including a time switch, means operated by the time switch after a predetermined time for simultaneously stopping the heating action and the suction pump motor, and for releasing the remaining pressure and actuating a signal.

WILLIBALD HAMBURGER.